Patented June 8, 1926.

1,587,977

UNITED STATES PATENT OFFICE.

WILLIAM MOORE, OF CHAPPAQUA, NEW YORK, AND CORNELIUS D. VREELAND, OF VINELAND, NEW JERSEY.

FUNGICIDE.

No Drawing.    Application filed March 30, 1925. Serial No. 19,497.

This invention relates to fungicides, more particularly to a method of and means for greatly increasing the effectiveness of fungicides now on the market.

In the patent to William Moore, No. 1,376,153, dated April 26, 1921, for insecticides, is described an insecticide of the arsenical type having increased effectiveness. The action thereof is based upon the fact that various substances when wetted with water take on either a positive or a negative electric charge, generally the latter. Among these, the foliage of all plants has a negative electric charge when wet and advantage is taken of this characteristic to cause the insecticide to adhere to the plant. Ordinarily, an arsenical insecticide has a negative charge and, therefore, is repelled by the plant and to overcome this the same is treated in such a manner as to give it a positive charge, thus causing it to stick to the plant by the attraction of the unlike charges, regardless of weather conditions.

This is accomplished by causing the insecticide to adsorb a metallic ion having a positive charge. An arsenical, such as Paris green or lead arsenate, is suspended in water and is treated with ferric hydroxide suspended in water, the ferric ion is adsorbed by the arsenical giving it a positive charge. Preferably, the positive charge is given to the arsenical at the time it is made by first providing a solution of say sodium arsenate and then adding the same to a solution of ferric chloride to form a precipitate, which consists essentially of ferric arsenate containing an adsorbed ferric ion, giving it a positive charge.

We have now discovered, after a long series of experiments, that the principles set forth in the patent, above identified, are applicable to fungicides of various types, both organic and inorganic, such as copper compounds. For example we may take Bordeaux mixture and suspend the same in water, adding thereto a solution of calcium acetate, which is adsorbed by the copper compound, or otherwise associated therewith, giving it a positive charge.

A similar result may be obtained even more effectively by giving the Bordeaux mixture a positive charge at the time it is made. In this case we may take 1200 pounds of blue vitriol and dissolve it in water so as to provide a solution having a specific gravity of 1.083 and mix therewith a volume of milk of lime of about 258 gallons and which has a specific gravity of 1.091, these amounts being sufficient to give about 1270 pounds of dried product. To the precipitated mixture formed, before drying, there is added an amount of a solution of calcium acetate, calculated on the dry basis, equal to about 5% of the weight of the dried, final product. The calcium acetate being a combination of a strong base and a weak acid will give, in solution, a preponderance of positively charged calcium ions which will impart a positive charge to the fungicide and thus cause the same to adhere to the plant to be protected.

Instead of adding calcium acetate to the precipitated Bordeaux mixture, we may simply add a sufficient amount of acetic acid, or the like thereto, to obtain a similar result.

Although we have described our invention setting forth a specific example thereof relating to the manufacture of Bordeaux mixture, it is to be understood that our invention is not limited thereto as it will be apparent to those skilled in the art that various changes may be made therein without departing from the principles set forth. For instance, we may substitute for the Bordeaux mixture a compound of a metal having fungicidal properties and we may even use a fungicide of organic origin. Salts having other acid radicles may be used, provided the acid is ionized to a lesser degree than the metal. Salts of metals other than calcium are adapted to our invention and we have successfully used the acetates of copper and aluminium in place of calcium, the aluminium salt being probably preferable over the others. The character of the acetates has a marked influence on the production of a positive charge, and the acetates of calcium, aluminium and copper may be made of a less basic character and therefore will impart a greater positive charge to the fungicide.

By the term "positively charged ion" used in the claims, we do not limit ourselves to the actual presence in the material of free positive ions, but we intend the term to include the presence of a substance, either in the ionized or in molecular form, which is capable of producing, when wetted, a sufficient number of positive ions to impart a positive character to the fungicide. By the term "weak acid" we intend to include an acid which may not necessarily be classed with the weak acids, but which is weak relative to the metal with which it is associated. The expression "precipitating the same with", used in some of the claims, does not necessarily mean the simultaneous precipitation of the insoluble fungicidal compound with the material providing the positive ions, as it is apparent that the latter material may be applied to the fungicide at any of several stages in the manufacture thereof, as described in the specification. These and other changes may be made in the details of our invention, the scope of which is set forth in the claims appended hereto.

What we claim is:—

1. A fungicide comprising an insoluble copper compound having an adsorbed positively charged ion.

2. A fungicide comprising an insoluble copper compound having an adsorbed positively charged ion obtained from an excess of a soluble salt of a weak acid.

3. A fungicide comprising an insoluble copper compound having an adsorbed positively charged ion obtained from an excess of a soluble calmium salt of a weak acid.

4. A fungicide comprising an insoluble copper compound containing a soluble salt of a weak acid.

5. A fungicide comprising Bordeaux mixture containing an adsorbed calcium ion.

6. A fungicide comprising Bordeaux mixture associated with calcium acetate.

7. A method of making fungicides which comprises providing a solution of a salt of a metal having fungicidal properties, precipitating an insoluble compound of said metal and adding to it a small quantity of a soluble salt of a weak acid.

8. A method of making fungicides which comprises providing a solution of a salt of copper, precipitating an insoluble compound of copper and adding to it a small quantity of a soluble salt of a weak acid.

9. A method of making fungicides which comprises providing a solution of a salt of copper, precipitating an insoluble compound of copper with an excess of milk of lime and adding to it a small quantity of a calcium salt of a weak acid.

10. A method of making fungicides which comprises providing a solution of copper sulphate, adding lime thereto to precipitate the copper, and adding calcium acetate to the precipitate.

11. A method of making fungicides which comprises providing a solution of copper sulphate, adding lime thereto to precipitate the copper, and adding about 5% of calcium acetate to the precipitate.

In testimony whereof, we have hereunto subscribed our names.

WILLIAM MOORE.
CORNELIUS D. VREELAND.